(12) United States Patent
Hasegawa

(10) Patent No.: US 9,131,375 B2
(45) Date of Patent: Sep. 8, 2015

(54) WIRELESS COMMUNICATION SYSTEM, COMMUNICATION CONTROL METHOD, AND BASE STATION

(75) Inventor: Hajime Hasegawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 366 days.

(21) Appl. No.: 13/613,145

(22) Filed: Sep. 13, 2012

(65) Prior Publication Data
US 2013/0005378 A1    Jan. 3, 2013

Related U.S. Application Data

(63) Continuation of application No. PCT/JP2010/054574, filed on Mar. 17, 2010.

(51) Int. Cl.
| | |
|---|---|
| *H04B 7/00* | (2006.01) |
| *H04W 16/06* | (2009.01) |
| *H04W 92/20* | (2009.01) |
| *H04W 84/04* | (2009.01) |
| *H04W 72/04* | (2009.01) |

(52) U.S. Cl.
CPC .......... *H04W 16/06* (2013.01); *H04W 72/0426* (2013.01); *H04W 84/047* (2013.01); *H04W 92/20* (2013.01)

(58) Field of Classification Search
CPC ................................................ H04W 72/0426
USPC ........ 455/509, 522, 452.1, 452.2, 453, 67.11; 370/330, 333, 335
See application file for complete search history.

(56) References Cited

U.S. PATENT DOCUMENTS

| | | | |
|---|---|---|---|
| 8,260,207 B2 * | 9/2012 | Srinivasan et al. | 455/63.1 |
| 8,462,646 B2 * | 6/2013 | Barberis et al. | 370/252 |
| 2006/0166677 A1 * | 7/2006 | Derakshan et al. | 455/453 |
| 2008/0076440 A1 | 3/2008 | Guo et al. | |
| 2009/0068944 A1 | 3/2009 | Kang et al. | |
| 2010/0009695 A1 | 1/2010 | Kwon et al. | |
| 2010/0254344 A1 * | 10/2010 | Wei et al. | 370/330 |
| 2011/0111766 A1 * | 5/2011 | Yang et al. | 455/452.2 |

FOREIGN PATENT DOCUMENTS

| | | |
|---|---|---|
| EP | 1 940 188 | 7/2008 |
| JP | 10-136443 | 5/1998 |
| JP | 2007-116703 | 5/2007 |
| JP | 2007-129405 | 5/2007 |
| JP | 2008-211645 | 9/2008 |

(Continued)

OTHER PUBLICATIONS

International Search Report dated Apr. 27, 2010, from corresponding International Application No. PCT/ JP2010/054574.

(Continued)

*Primary Examiner* — Sanh Phu
(74) *Attorney, Agent, or Firm* — Katten Muchin Rosenman LLP

(57) ABSTRACT

A wireless communication system includes a first base station and a second base station that respectively communicate with a mobile station by using a wireless resource. The first base station includes a resource control unit that controls allocation of the wireless resource to the second base station. The second base station includes a communication unit that communicates with the mobile station by using the wireless resource allocated from the first base station.

6 Claims, 10 Drawing Sheets

(56) References Cited

FOREIGN PATENT DOCUMENTS

| JP | 2010-16494 | 1/2010 |
|---|---|---|
| WO | 2009/006085 | 1/2009 |
| WO | 2009/102906 | 8/2009 |

OTHER PUBLICATIONS

European Search Report dated May 15, 2015 from corresponding Application No. 10847878.5.

* cited by examiner

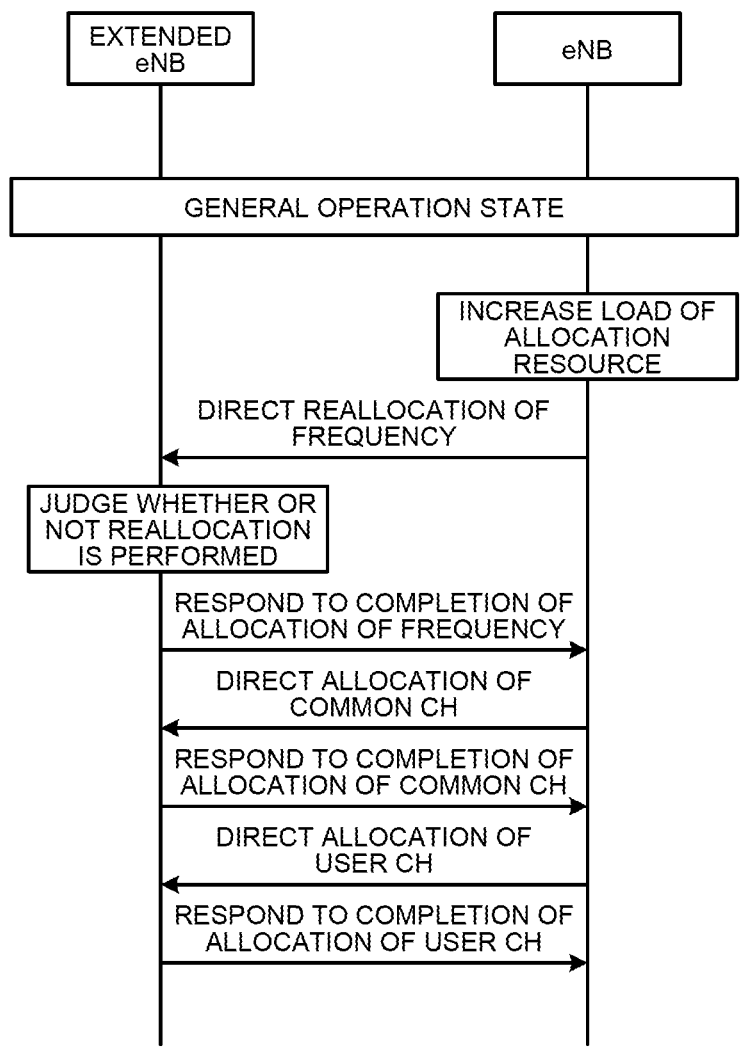

WIRELESS COMMUNICATION SYSTEM, COMMUNICATION CONTROL METHOD, AND BASE STATION

CROSS-REFERENCE TO RELATED APPLICATION

This application is a continuation application of International Application PCT/JP2010/054574, filed on Mar. 17, 2010, and designating the U.S., the entire contents of which are incorporated herein by reference.

FIELD

The present invention relates to a wireless communication system, a communication control method in the system, and a base station providing the system, and to resource allocation control and area construction control at the time of extending a service area of the base station.

BACKGROUND

As an extension technique of a service area in a wireless communication system, a booster that amplifies radio wave strength or a repeater that improves a communication environment is installed or more base stations are newly established under a base station in the related art.

However, in extending the service area by the component such as the repeater or booster, the radio wave strength is just amplified, the amplified communication radio wave interferes with a communication radio wave from a neighboring base station, and a technique problem that causes a communication environment to deteriorate rather occurs.

Meanwhile, in regard to the technique that extends the service area by newly establishing more base stations under the base station, for example, a base station installation method such as a multi hop relay type or a hierarchical cell configuration type is known.

In the related patent literatures described below, for example, in the multi hop relay type, a configuration in which in-cell interference between the base station and a relay station is suppressed by dividing a frequency band is known. A communication channel allocation method depending on an interference state is known between the base station having the hierarchical cell configuration and the subordinate base station.

Patent Document 1: Japanese Laid-open Patent Publication No. 2007-116703
Patent Document 2: Japanese Laid-open Patent Publication No. 10-136443

However, in the wireless communication system, in the case of newly establishing the base station for extending one base station service area, the established base station provides a communication environment based on a resource statically allocated from the original base station. As a result, for example, when traffic is increased in the service area extended by the relay station or the subordinate base station due to a predetermined cause, the allocated resource is short, such that the sufficient communication environment is not provided.

However, even in the service area of one base station, the radio wave strength is not sufficiently ensured and a dead zone where the communication environment is not provided may be generated, in shades of other buildings or undergrounds. The geographical change may appropriately occur in real time and it is preferable that the service area is appropriately extended even in order to provide a communication environment which a user satisfies. In the static resource allocation, real-time handling is not appropriately performed.

SUMMARY

According to an aspect of the embodiments, a wireless communication system includes a first base station and a second base station that respectively communicate with a mobile station by using a wireless resource, wherein the first base station comprises a resource control unit that controls allocation of the wireless resource to the second base station, and the second base station comprises a communication unit that communicates with the mobile station by using the wireless resource allocated from the first base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating a sequence of each unit of resource reallocation depending on the traffic of the base station of the embodiment.

DESCRIPTION OF EMBODIMENTS (1) First

Figure 1:
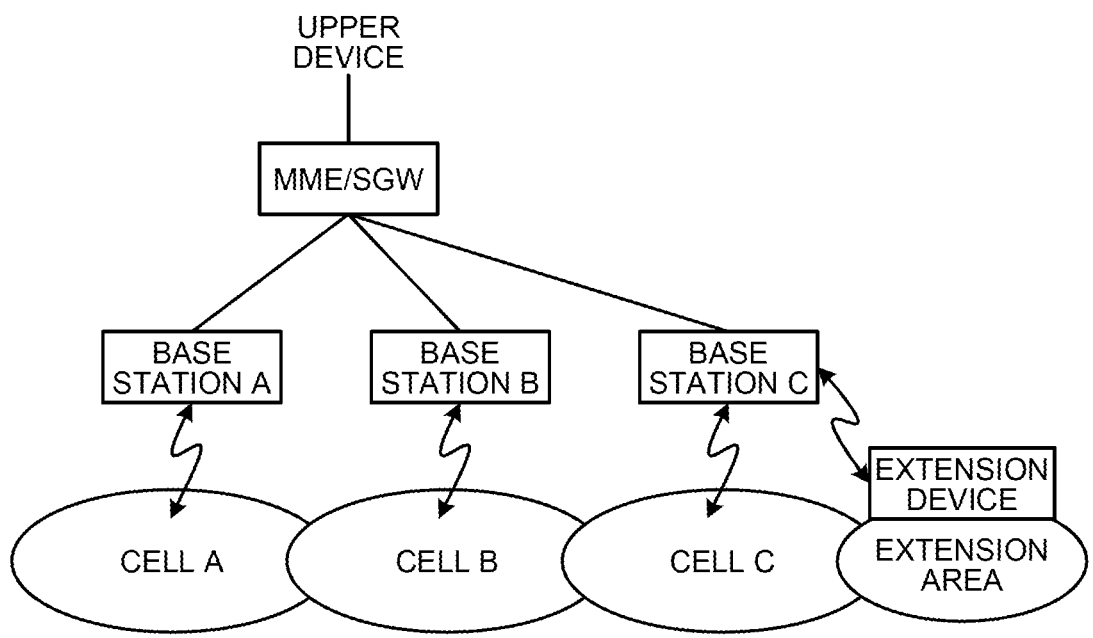
FIG. 1 is a diagram illustrating a configuration example of a wireless communication system.
Figure 2:
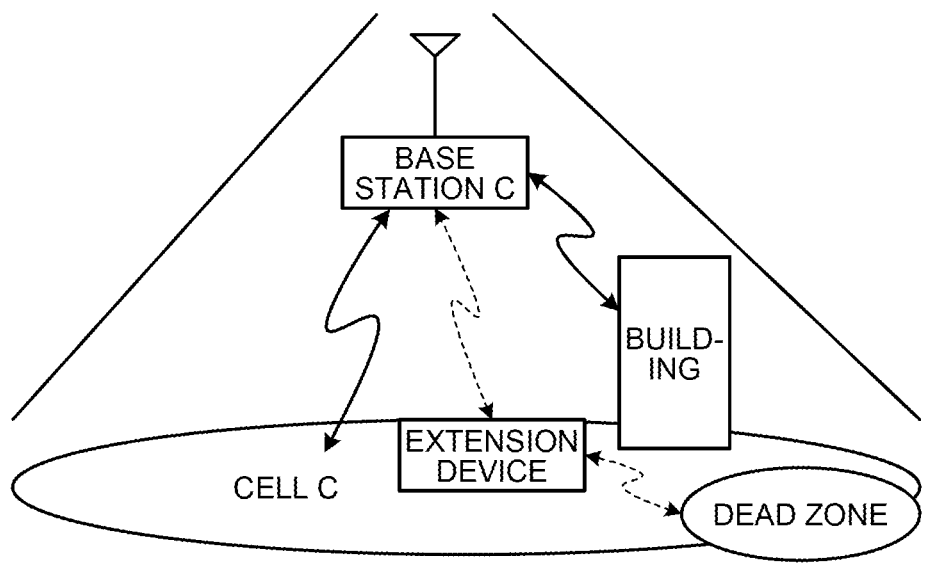
FIG. 2 is a diagram illustrating a configuration example of a base station for extending a service area.

Referring to FIGS. 1 and 2, an aspect of extension of a base station service area in a wireless communication system will be described. Herein, FIG. 1 is a diagram illustrating a plurality of base stations A, B, and C connected to an MME (mobility management entity) under an upper device, and a service area of each base station.

As illustrated in FIG. 1, the base station A forms a cell A, the base station B forms a cell B, and the base station C forms a cell C, and a communication environment is provided to a mobile terminal in the cell. Herein, an extension device is present under the base station C and connected to the base station C in a wireless or wired manner. As the extension device, for example, there is a component such as a booster that amplifies communication radio waves or a component such as a relay station having an independent service area (extension area) by using allocated wireless resource.

For example, as illustrated in FIG. 2, even in the cell C formed by the base station C, a dead zone such as inside or a shade of a building or a basement where the communication radio waves are not reached while maintaining sufficient radio wave strength and a sufficient communication environment is not provided may be generated. Herein, it is possible to extend the service area and to provide the communication environment with respect to the dead zone by using the extension device.

The booster is a component that increases the strength of a radio wave transmitted by the base station C and the service area is extended by amplifying the communication radio wave around the dead zone having the weak radio wave strength. In this case, the amplified communication radio wave may interfere with the communication radio wave of other neighboring base station A or B. As the interference occurs, there is a case in which a sufficient line quality is not maintained while the communication environment is provided.

Meanwhile, in a relay station that forms the service area by using the allocated wireless resource, the communication environment is provided in the extension area which is independently formed by using the wireless resource such as a frequency band or a time band allocated from the original base station C. In this case, for example, when a frequency band transmitted by the base station C has a frequency resource of a bandwidth, it is difficult to allocate that the same frequency band is used for each of the transmission from the base station C and transmission from the extension device due to the interference of the communication radio wave. As a result, the frequency band is divided and used so that each interference does not occur. Hereinbelow, an allocation aspect of the wireless resource such as the frequency band in the embodiment will be described.

(2) Basic Configuration Example

Hereinafter, an embodiment of the present invention will be described with reference to the accompanying drawings.

First, referring to FIGS. 3 to 5, configurations of the respective components constituting the wireless communication system of the embodiment will be described.

Figure 3:
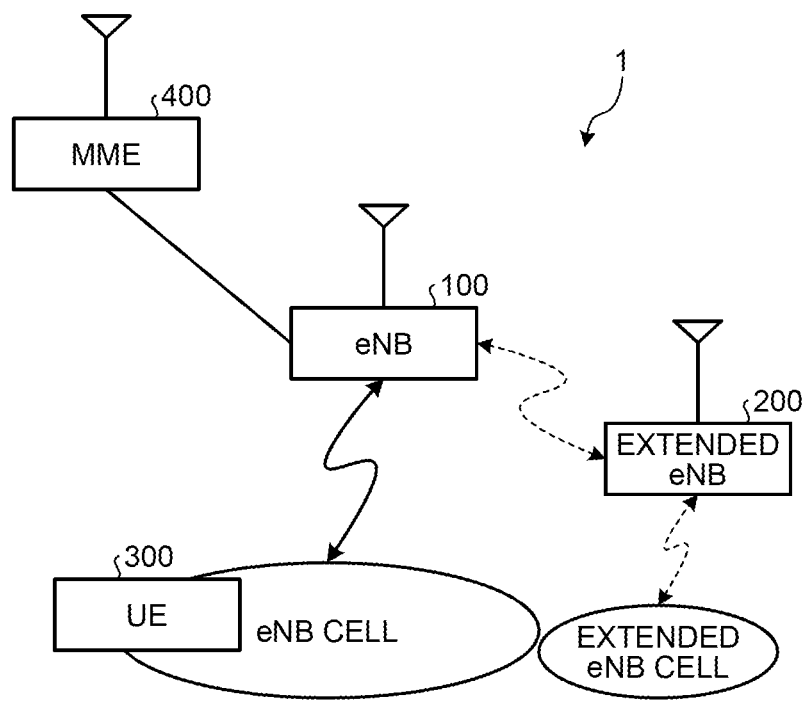
FIG. 3 is a block diagram illustrating an embodiment of the wireless communication system.
Figure 4:
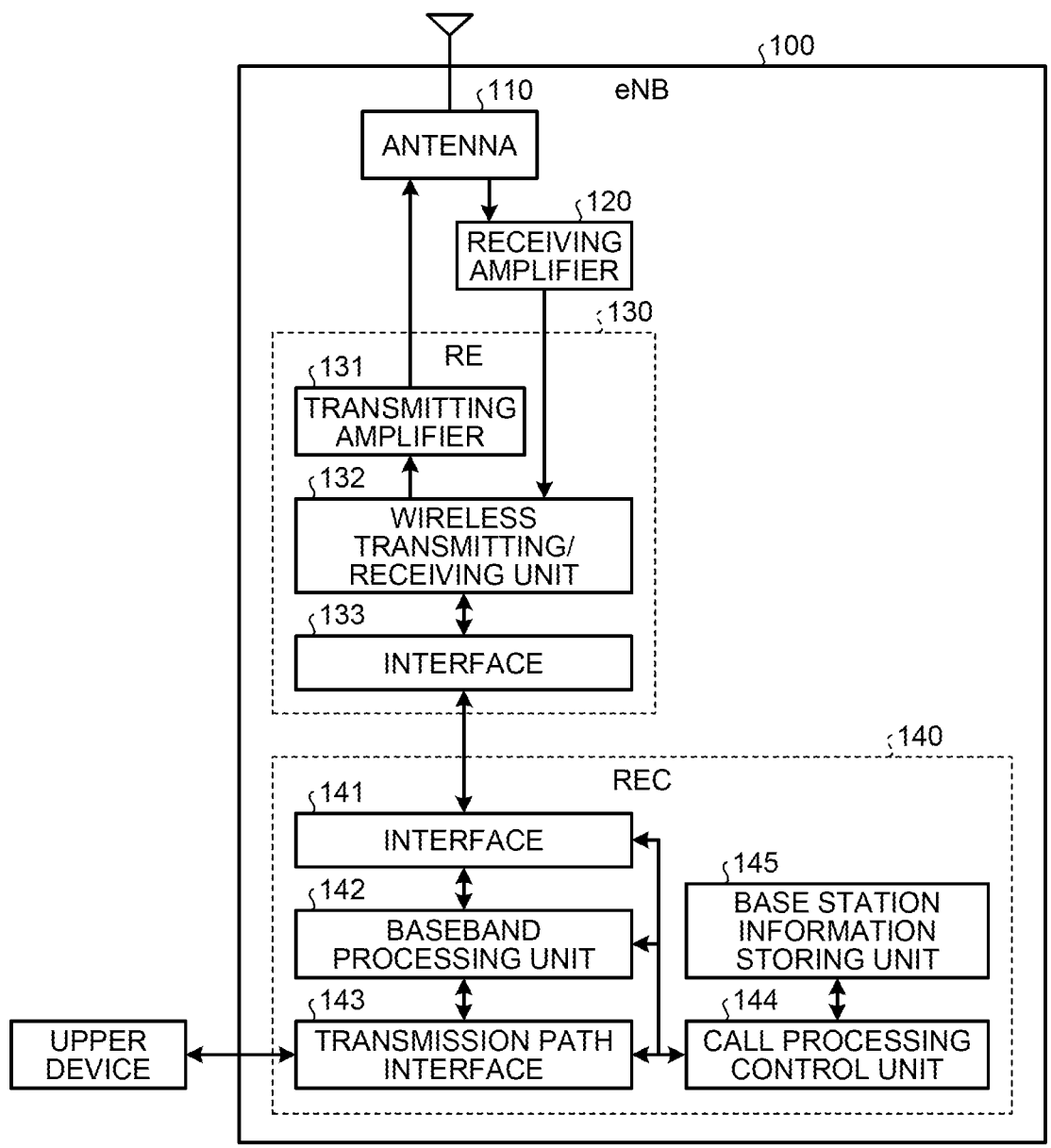
FIG. 4 is a block diagram illustrating a basic configuration of the base station of the embodiment.

FIG. 3 is a diagram illustrating a configuration of a wireless communication system 1 of the embodiment. As illustrated in FIG. 3, the wireless communication system 1 includes at least an eNB (evolved Node B) 100 as the base station and an extended eNB 200 installed under the eNB 100, and performs communication with respect to a UE 300 as the mobile terminal and an MME 400 which is the upper device of the eNB 100. The configuration in the related art may be applied to the UE 300 and the MME 400 as it is.

The eNB 100 is one example of a "first base station" of the wireless communication system in the embodiment. As illustrated in the block diagram of FIG. 4, the eNB 100 includes an antenna 110, a receiving amplifier 120, RE (radio equipment) 130, and an REC (radio equipment controller) 140.

The antenna 110 forms a service area (eNB cell) by transmitting and receiving the communication radio wave. Transmission data transmitted by the antenna 110 is supplied from the RE 130 and reception data received by the antenna 110 is supplied to the receiving amplifier 120.

The receiving amplifier 120 amplifies power of the supplied reception data and supplies the amplified power to a wireless transmitting/receiving unit 132 in the RE 130.

The RE 130 is a wireless device that includes a transmitting amplifier 131, the wireless transmitting/receiving unit 132, and an RE-side interface 132.

The transmitting amplifier 131 amplifies power of transmission data supplied from the wireless transmitting/receiving unit 132 and supplies the amplified power to the antenna 110.

The wireless transmitting/receiving unit 132 is configured to have two functions of a transmitter that supplies transmission data supplied from the REC 140 to the transmitting amplifier 131 and a receiver that supplies reception data supplied from the receiving amplifier 120 to the REC 140. The wireless transmitting/receiving unit 132 may have an independent configuration such as a functional unit as each of the transmitter and the receiver.

The RE-side interface 133 performs processing such as signal processing or clock adjustment with respect to the transmission data and the reception data and thereafter, transmits and receives the processed transmission data and the reception data to/from an REC-side interface 141.

The REC 140 is a control device for controlling an operation of the RE 130, which includes the REC-side interface 141, a baseband processing unit 142, a transmission path interface 143, a call processing control unit 144, and a base station information storing unit 145.

The REC-side interface 141 performs the signal processing of the transmission/reception data and thereafter, transmits and receives the signal-processed transmission/reception data to/from the RE-side interface 133.

The baseband processing unit 142 performs demodulation/modulation or signal processing of line data supplied from the upper device through the transmission path interface 143 and allocates the frequency band and thereafter, supplies the corresponding data as a downlink baseband signal to the REC-side interface 141. The line data is extracted from a reception data as an uplink baseband signal supplied from the REC-side interface 141 and transmitted to the upper device through the transmission path interface 143.

The call processing control unit 144 is one example of "resource control means" in the embodiment and is configured to perform wireless channel management, physical line management, and quality management.

The call processing control unit 144 performs a control of allocating the resource such as an individual transmission power control to the target UE 300 based on various pieces of information transmitted from the mobile terminal UE (user equipment) 300 in the service area. The call processing control unit 144 generates notification information to the UE 300 and transmits the notification information to the inside of the cell on a BCCH (broadcast control channel) through the baseband processing unit 142.

The call processing control unit 144 controls allocation of the wireless resource to/from the extended eNB 200 as the extension device, and the wireless transmitting/receiving unit 132 transmits and receives a signal requested for the control.

The base station information storing unit 145 is a storage unit configured to include a memory capable of storing data and stores information such as a wireless resource used by a neighboring base station of the eNB 100.

Figure 5:
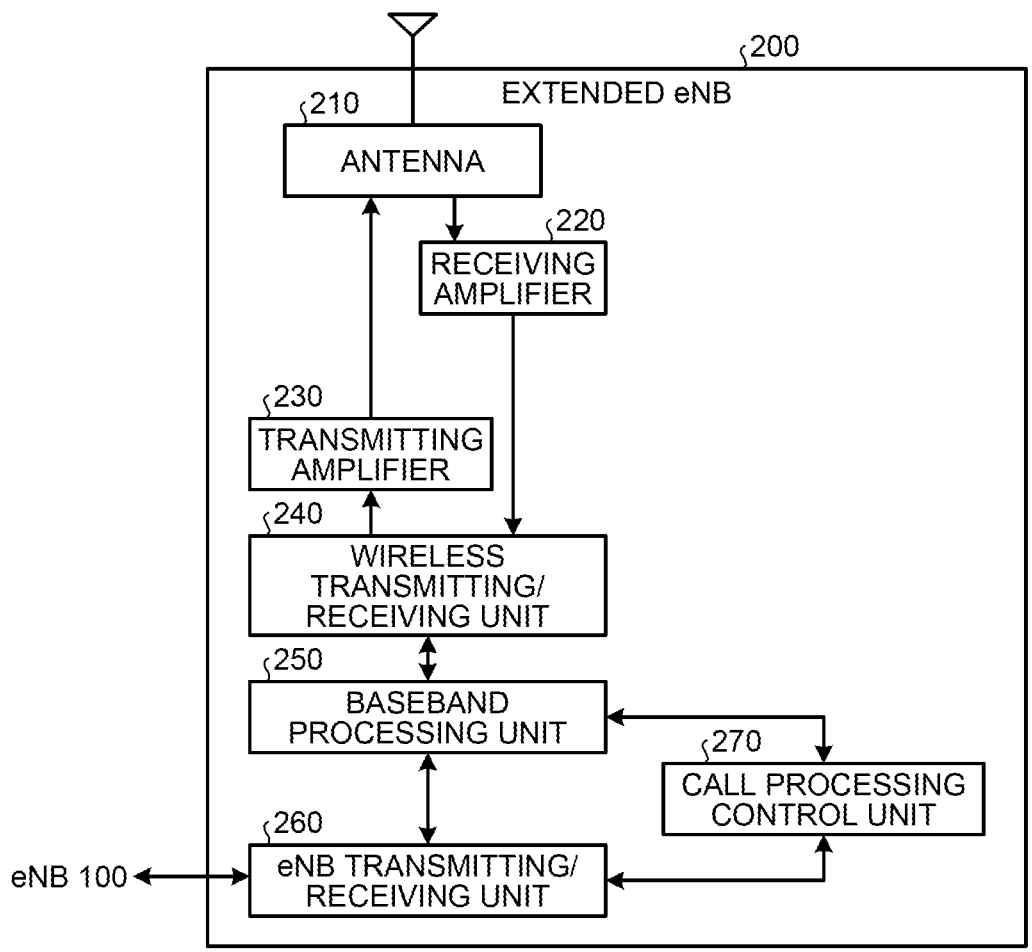
FIG. 5 is a block diagram illustrating a basic configuration of an extended base station of the embodiment.

Referring to FIG. 5, a basic configuration of the extended eNB 200 illustrated in FIG. 3 will be described. The extended eNB 200 is one example of a "second base station" of the wireless communication system in the embodiment.

As illustrated in FIG. 5, the extended eNB 200 includes an antenna 210, a receiving amplifier 220, a transmitting amplifier 230, a wireless transmitting/receiving unit 240, a baseband processing unit 250, an eNB transmitting/receiving unit 260, and a call processing control unit 270.

The antenna 210 to the baseband processing unit 250 are the same as the components having the same names of the eNB 100. Transmission data supplied from the eNB transmitting/receiving unit 260 is transmitted and received reception data is supplied to the eNB transmitting/receiving unit 260.

The eNB transmitting/receiving unit 260 is an interface that transmits/receives the transmission/reception data to/from the eNB 100 and is connected to the eNB 100 in a wired or wireless manner.

The call processing control unit 270 forms a service area (extended eNB cell) by transmitting and receiving data by using the wireless resource such as the frequency band allocated by the call processing control unit 144 of the eNB 100.

The call processing control unit 270 may be one example of "resource request means" in the embodiment and requests allocation of the wireless resource to the call processing control unit 144 of the eNB 100 according to a communication amount in the extended eNB 200.

The UE 300 is, for example, a mobile terminal in the related art, includes a control unit that performs wireless channel management, quality management, and mobility management, and communicates with the eNB 100 or the extended eNB 200 in the cell where the UE 300 is present. In detail, the UE 300 receives the communication radio wave transmitted from the eNB 100 or the extended eNB 200 and receives common channel information such as the notification information and thereafter, collects quality information of each frequency resource and notifies the collected quality information to the eNB 100 or the extended eNB 200. By the operation, the UE 300 ensures its own communication resource and controls the communication.

The MME 400 is an upper node of the base station used in a mobile communication system to which a LTE (long term evolution) technique is applied and is a device that performs session management such as setting and opening a session for packet communication or mobility management such as hand-over between the base stations by the UE 300. In the wireless communication system 1, other upper node may be connected instead of the MME 400.

(3) Allocation Processing of Wireless Resource at the Time of Actuation

Processing at the time of allocating the wireless resource between the eNB 100 and the extended eNB 200 according to the embodiment will be described. In the following description, as one example of the wireless resource, allocation processing of the frequency band will be described.

Figure 6:
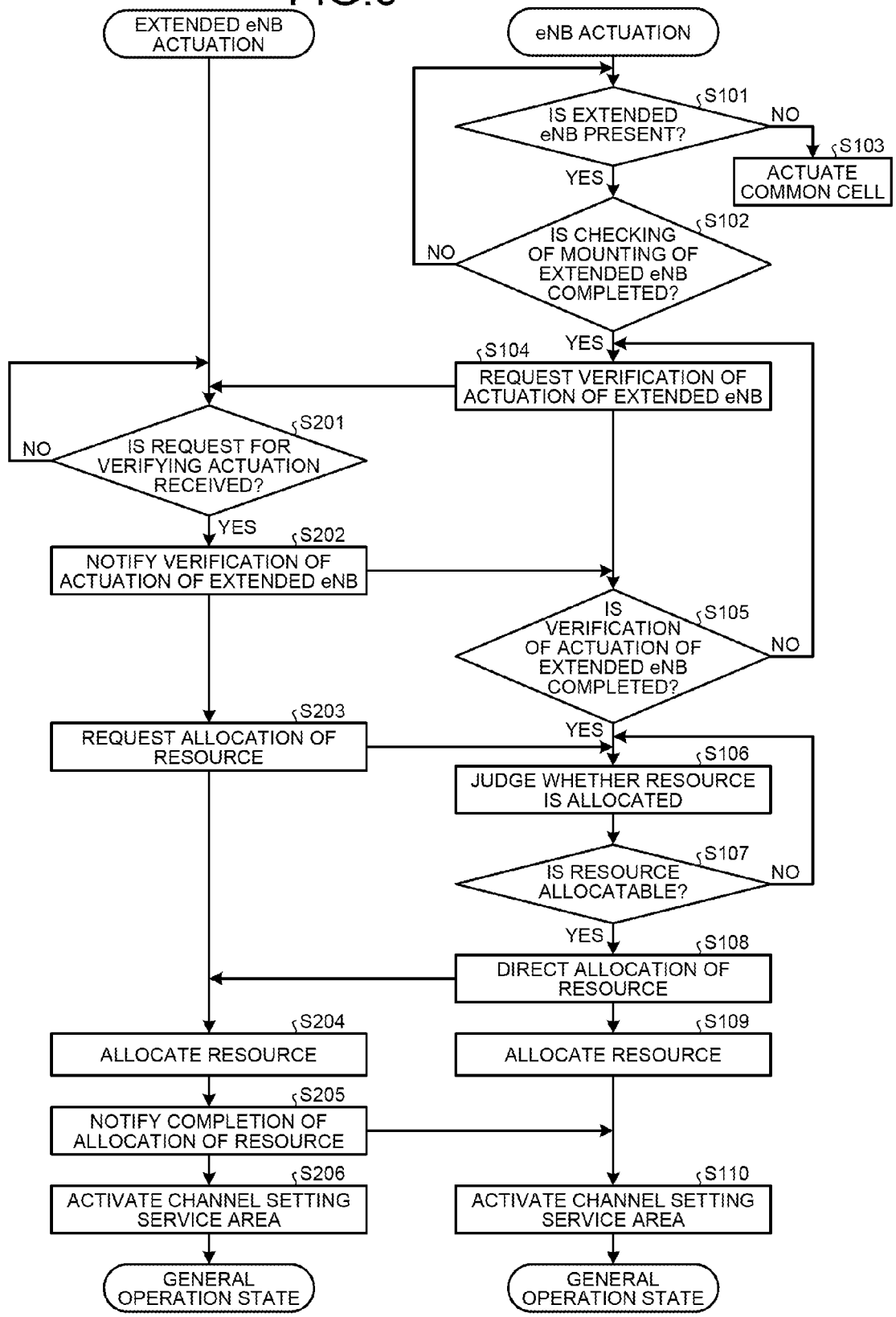
FIG. 6 is a diagram illustrating a processing flow of each unit when the extended base station of the embodiment is actuated.
Figure 7:
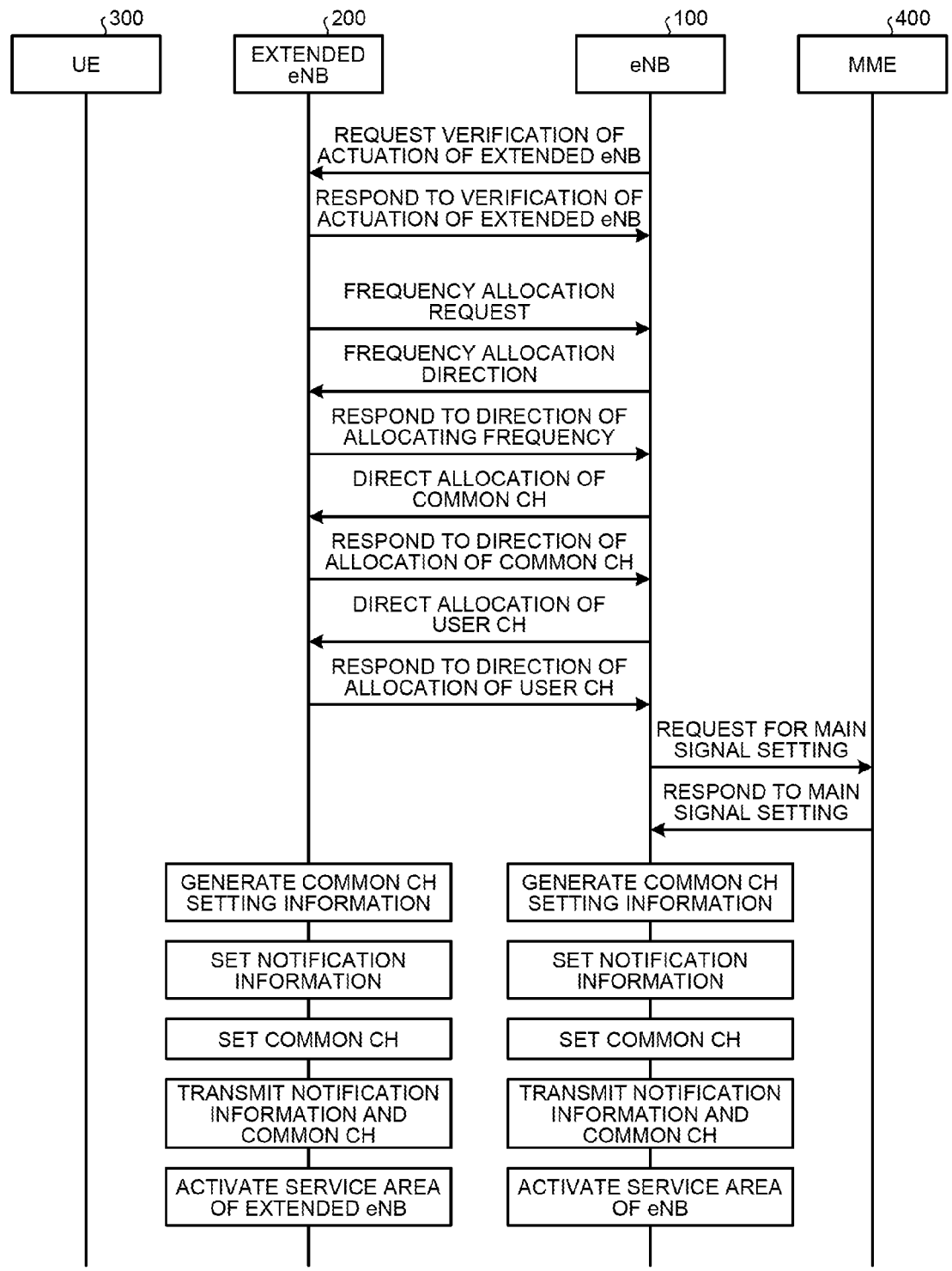
FIG. 7 is a diagram illustrating a sequence of each unit when the extended base station of the embodiment is actuated.

The processing when the eNB 100 and the extended eNB 200 are actuated will be described with reference to both a processing flow illustrated in FIG. 6 and a processing sequence of each unit illustrated in FIG. 7.

First, the eNB 100 and the extended eNB 200 are actuated by starting the supply of power in the eNB 100 and the extended eNB 200, respectively.

Herein, the call processing control unit 144 of the eNB 100 judges whether the subordinate extended eNB 200 is present by referring to data in the base station information storing unit 145 (step S101). When the extended eNB 200 is not present (step S101: No), the service area is activated by starting transmission/reception of data as usual (step S103).

Meanwhile, when the subordinate extended eNB 200 is present (step S101: Yes), the call processing control unit 144 judges whether the extended eNB 200 is mounted, that is, whether setting for the use is completed or not (step S102).

When the extended subordinate eNB 200 is present (step S101: Yes) and further, mounting of the extended eNB 200 is completed (step S102: Yes), the call processing control unit 144 requests for notification of verifying that the extended eNB 200 is actuated, to the extended EeNB 200 (step S104).

The extended eNB 200 after actuation receives a request for verifying the actuation (step S201: Yes) and thereafter, notifies the eNB 100 of the verification of the actuation (step S202). The call processing control unit 144 of the eNB 100 receives the notification of the actuation verification from the extended eNB 200 to verify the actuation of the extended eNB 200 (step S105: Yes).

When the plurality of extended eNBs 200 is present under the eNB 100 and further mounted, the call processing control unit 144 individually requests for the actuation verification to the respective extended eNBs 200 and verifies the actuation of the individual extended eNB 200 according to the received notification of the actuation verification.

Continuously, the call processing control unit 270 of the extended eNB 200 requests for allocation of the wireless resource such as the frequency band used in the wireless communication in the extended eNB 200, to the eNB 100. In this case, the call processing control unit 270 presents the necessary wireless resource based on the traffic or requested line quality in the extended eNB 200 expected by past data and requests the presented wireless resource to the eNB 100 (step S203).

The call processing control unit 144 of the eNB 100 judges whether or not the wireless resource may be allocated with respect to the notified request for the wireless resource allocation. In detail, the call processing control unit 144 judges whether or not the wireless resource requested by the extended eNB 200 may be allocated based on the traffic or requested line quality in the eNB 100 expected by past data (step S106).

When it is judged that the wireless resource may be allocated (step S107: Yes), the call processing control unit 144 of the eNB 100 transmits a direction of allocation of the wireless resource to the extended eNB 200 (step S108). For example, as illustrated in the sequence diagram of FIG. 7, a direction of the allocated frequency band or an allocation direction of a common CH (channel) and a user CH is included in the notification message.

Continuously, in the eNB 100 and the extended eNB 200, the wireless resource is allocated (step S109 and step S204). After the allocation of the wireless resource is completed in the extended eNB 200, the call processing control unit 270 appropriately transmits completion notifications such as a frequency allocation completion response, a common CH allocation completion response, and a user CH allocation completion response to the eNB 100 (step S205).

When the allocation of the wireless resource is completed, the eNB 100 requests for setting a main signal to the upper node such as the MME 400 and receives a setting response from the upper node.

The eNB 100 transmits the notification information after setting the channel to activate the cell as the service area (step S110). In detail, the call processing control unit 144 of the eNB 100 generates common CH setting information, sets the common CH, and sets notification information regarding the UE 300 and thereafter, transmits the notification information to activate the cell, as illustrated in the sequence diagram of FIG. 7.

Similarly, in even the extended eNB 200, after the allocation of the wireless resource is completed, the common CH and notification information are set and thereafter, transmitted to activate the cell (step S206).

As a result, the eNB 100 and the extended eNB 200 may activate the cells of the respective service areas and provide the communication environment to the UE 300 which is present.

According to a series of operations, when the extended eNB 200 mounted under the eNB 100 is actuated, the wireless resource may be appropriately allocated and the communication environment may be provided in the cell formed by the extended eNB 200.

Further, in this case, the wireless resource allocated to the extended eNB 200 may be a wireless resource which is previously set and further, may be a wireless resource dynamically determined by the call processing control unit 144 according to the traffic of the eNB 100.

Further, in the example described with reference to the sequence diagram of FIG. 7, the message is divided for each message element to be notified and replied, but a plurality of message elements may be actually organized to be transmitted/received.

The notification message used in the sequence will be exemplified.

As the allocated frequency band information, for example, a center frequency code such as "Freq code" or notification information representing an allocation range in a target frequency band is used.

As the common CH allocation resource information, for example, actuatable common CH information indicating a common CH actuatable resource in a target system, or CH actuation mode information and CH actuatable position information designating control parameters regarding common CH actuation such as a predetermined band, time, position, and the like and, for example, deciding an actuation method in general actuation or predetermined limitative actuation, transmission power designation information designating absolute power or relative power for a representative CH, or the like is used.

As the user CH allocation resource information, for example, CH actuation mode information and CH actuatable position information designating control parameters regarding common CH actuation such as a predetermined band, time, position, and the like and, for example, deciding an actuation method in general actuation or predetermined limitative actuation, transmission power designation information designating absolute power or relative power for a representative CH, or the like is used.

(4) Request for Resource Allocation According to Traffic of Extended eNB Side

Figure 8:
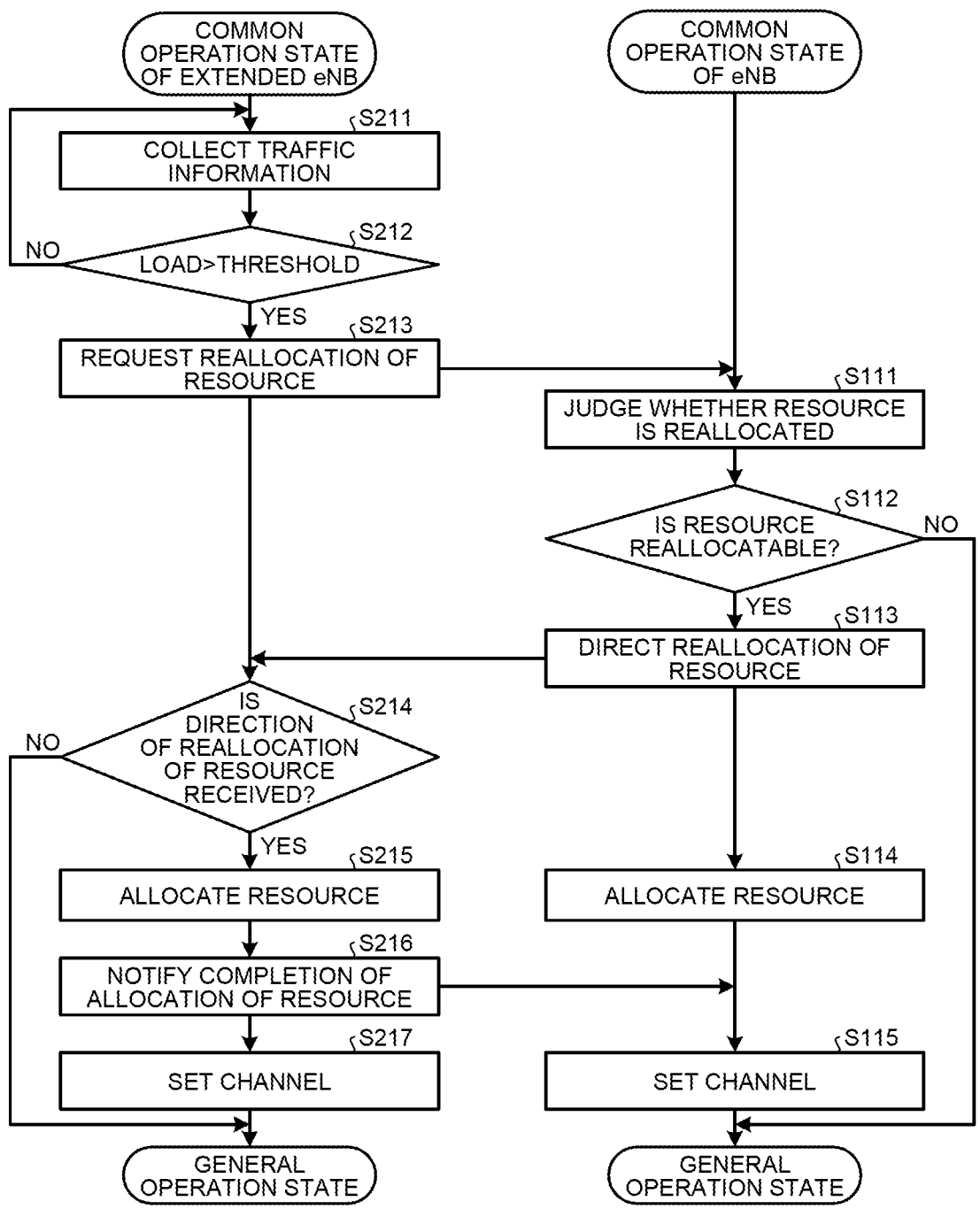
FIG. 8 is a diagram illustrating a processing flow of resource reallocation depending on traffic of the extended base station of the embodiment.
Figure 9:
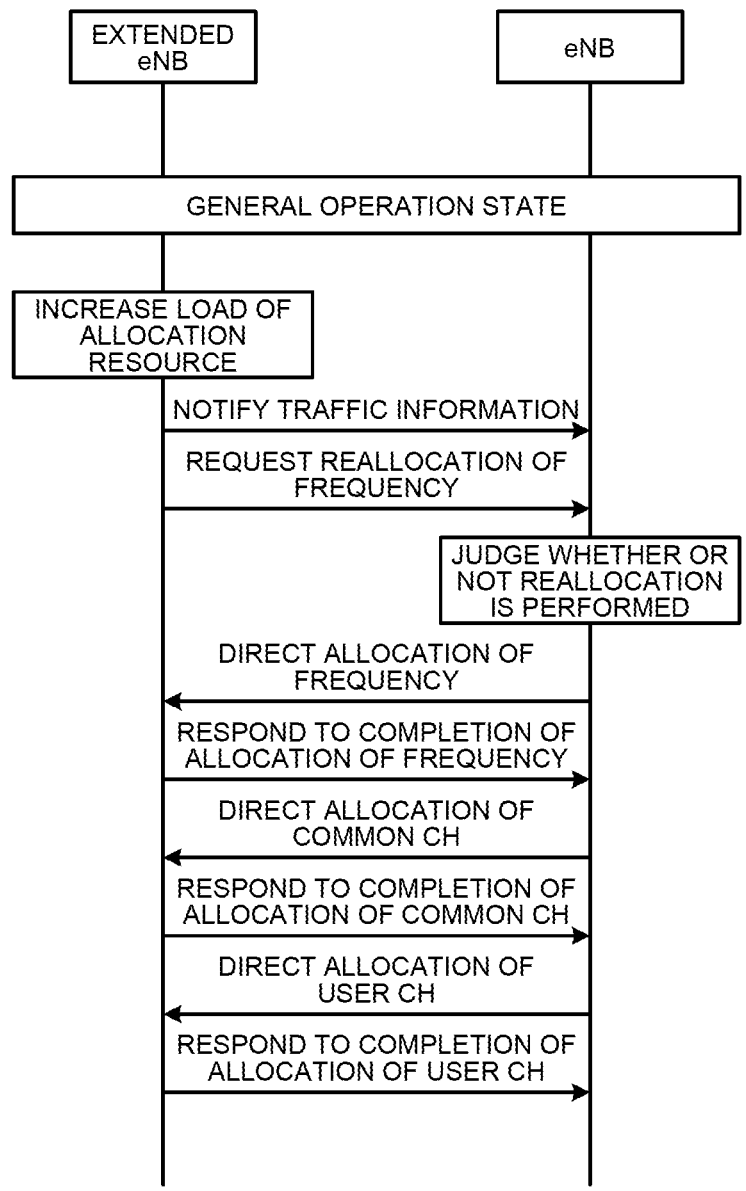
FIG. 9 is a diagram illustrating a sequence of each unit of resource reallocation depending on traffic of the extended base station of the embodiment.

A reallocation operation of the wireless resource depending on the increase in the traffic of the extended eNB 200 side between the eNB 100 and the extended eNB 200 which are generally operated will be described with reference to a flowchart of FIG. 8 and a sequence diagram of FIG. 9.

When the extended eNB 200 is commonly operated, the call processing control unit 270 appropriately collects information on the traffic in the extended eNB 200 (step S211). In this case, the call processing control unit 270 collects, for example, a load of the traffic, the amount of interference, or the remaining amount of transmission power, or the like in the extended eNB 200.

In the collected traffic information, when the load of the traffic is more than a predetermined threshold (step S212, Yes), the call processing control unit 270 notifies the eNB 100 of a request for allocating additional wireless resources corresponding to the traffic which is more than the threshold (step S213). Herein, the threshold for judging whether the request for the reallocation of the wireless resource is required or not is, for example, an upper limit of the traffic capable of providing a sufficient communication environment while the allocated wireless resource is not short in the extended eNB 200 and appropriately depends on the allocated wireless resource.

Further, the call processing control unit 270 may be configured to request reallocation of the wireless resource even though the load of the traffic is not more than the threshold when the wireless resource is anticipated to be short in the near future from an increase tendency of the detected traffic load.

The call processing control unit 144 of the eNB 100 judges whether the wireless resource required in the extended eNB 200 may be reallocated based on the traffic or the required line quality in the eNB 100 with respect to the notified reallocation request for the wireless resource (step S111).

When it is judged that the wireless resource may be allocated (step S112: Yes), the call processing control unit 144 of the eNB 100 transmits a direction of reallocation of the wireless resource to the extended eNB 200 (step S113). For example, as illustrated in the sequence diagram of FIG. 9, the direction of the allocated frequency band or the allocation direction of the common CH and the user CH is included in the direction message.

In the extended eNB 200, when the reallocation direction of the wireless resource is received (step S214: Yes), a newly allocated wireless resource is allocated in the extended eNB 200 (step S215). Simultaneously, in the eNB 100, the wireless resource is reallocated (step S114).

After the reallocation of the wireless resource is completed in the extended eNB 200, the call processing control unit 270 appropriately transmits the completion notifications such as the frequency allocation completion response, the common CH allocation completion response, and the user CH allocation completion response to the eNB 100, similarly as in step S205 (step S216).

After it is verified that the reallocation of the wireless resource is completed, the channel is set and the notification information is notified, such that providing the communication environment in the cell by the wireless resource after the allocation starts, similarly as in step S110 or S206 in the eNB 100 and the extended eNB 200, respectively (step S115, S217).

According to the series of operations, in the case where the sufficient communication environment is not provided by only the wireless resource allocated at the time of actuation such as a case where the UE 300 present in the cell of the extended eNB 200 is rapidly increased, the wireless resource is requested to be allocated to the eNB 100 again to thereby use the wireless resource capable of providing the sufficient communication environment.

As the operation of the extended eNB 200, for example, installation of the extended eNB 200 in a zone where a common period having relatively less traffics and a busy period when the traffic is rapidly increased are present may be considered. According to the operation of the extended eNB 200, the wireless resource is set to be provided with respect to the small quantity of traffic in just proportion by allocating the relatively small quantity of wireless resources during the common period, and as a result, the eNB 100 may effectively use the wireless resource. Meanwhile, during the busy period, the appropriate communication environment may be provided even when the traffic is increased by reallocating the wireless resource used by the eNB 100 according to the request for the reallocation of the wireless resource from the extended eNB 200. As such, it is very advantageous to perform negotiation associated with the reallocation of the wireless resource between the extended eNB 200 and the eNB 100 in that the wireless resource is effectively used.

(5) Request for Resource Allocation According to Traffic of eNB Side

Figure 10:
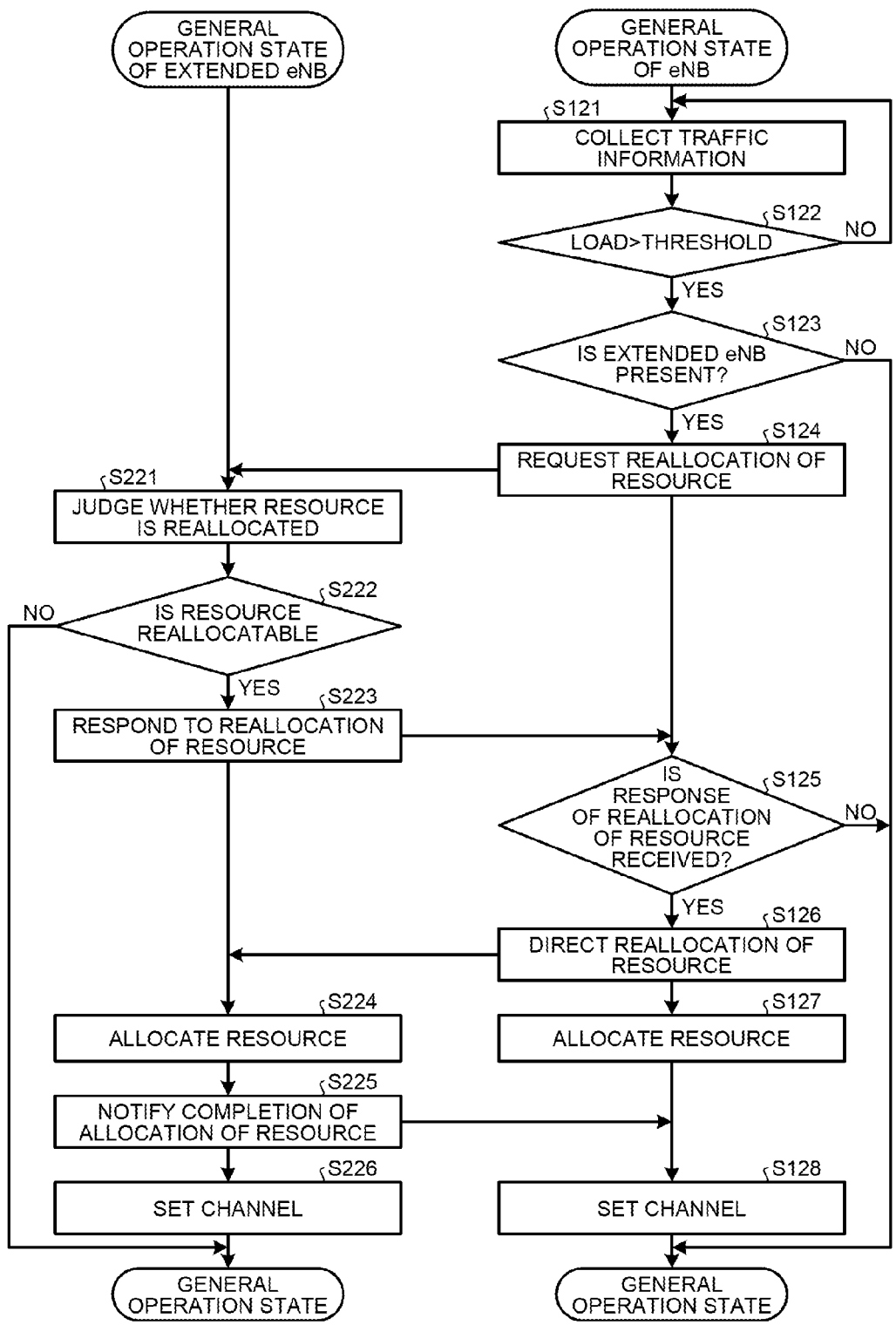
FIG. 10 is a diagram illustrating a processing flow of resource reallocation depending on the traffic of the base station of the embodiment.

A reallocation operation of the wireless resource depending on the increase in the traffic of the eNB 100 side between the eNB 100 and the extended eNB 200 which are commonly operated will be described with reference to a flowchart of FIG. 10 and a sequence diagram of FIG. 11.

When the eNB 100 is commonly operated, the call processing control unit 144 appropriately collects information on the traffic in the eNB 100 (step S121).

In the collected traffic information, when the load of the traffic is more than a threshold which is previously set (step S112: Yes), the call processing control unit 144 continuously detects the extended eNB 200 mounted under the eNB 100 at present by referring to data in the base station information storing unit 145 (step S123).

When the load of the traffic is more than the threshold (step S122: Yes) and further, the extended eNB 200 is mounted subordinately (step S123: Yes), the call processing control unit 144 notifies the extended eNB 200 of the request for the allocation of the additional wireless resource corresponding to the traffic which is more than the threshold (step S124).

Herein, the threshold for judging whether the request for the reallocation of the wireless resource is required or not is, for example, an upper limit of the traffic capable of providing a sufficient communication environment while the allocated wireless resource is not short in the eNB 100 and appropriately depends on the allocated wireless resource. Further, the call processing control unit 144 may be configured to request reallocation of the resource even though the load of the traffic is not more than the threshold when the wireless resource is anticipated to be short in the near future from an increase tendency of the detected traffic load, similarly as the call processing control unit 270.

The call processing control unit 270 of the extended eNB 200 judges whether the wireless resource may be reallocated based on the traffic or the required line quality in the extended eNB 200 with respect to the notified request of the reallocation of the wireless resource (step S221).

When it is judged that the wireless resource may be allocated (step S222: Yes), the call processing control unit 270 of the extended eNB 200 transmits the reallocation response of the wireless resource to the eNB 100 (step S223).

The call processing control unit 144 of the eNB 100 transmits a direction of reallocating the wireless resource to the extended eNB 200 (step S126) by receiving the reallocation response of the wireless resource from the extended eNB 200 (step S125: Yes). For example, as illustrated in the sequence diagram of FIG. 11, the direction of the allocated frequency band or the allocation direction of the common CH and the user CH is included in the direction message.

In the extended eNB 200, when the reallocation direction of the wireless resource is received, a newly allocated wireless resource is allocated (step S224). Simultaneously, in the eNB 100, the wireless resource is reallocated (step S127).

After the reallocation of the wireless resource is completed in the extended eNB 200, the call processing control unit 270 appropriately transmits the completion notifications such as the frequency allocation completion response, the common CH allocation completion response, and the user CH allocation completion response to the eNB 100, similarly as in step S205 (step S225).

After it is verified that the reallocation of the wireless resource is completed, the channel is set and the notification information is notified, such that providing the communication environment in the cell by the wireless resource after the allocation starts, similarly as in step S120 or S206 in the eNB 100 and the extended eNB 200, respectively (step S128, S226).

According to the series of operations, in the case where the sufficient communication environment is not provided by only the wireless resource allocated at the time of actuation such as a case where the UE 300 present in the cell of the eNB 100 is rapidly increased, the wireless resource is allocated to the extended eNB 200 again to thereby use the wireless resource capable of providing the sufficient communication environment. In this case, the eNB 100, for example, changes the allocation of the wireless resource so as to use in the eNB 100 some of the wireless resources used by the extended eNB 200 before the reallocation of the wireless resource.

According to an operation of the eNB 100, the eNB 100 may appropriately negotiate the wireless resource with the extended eNB 200 depending on the increase or decrease in the traffic at the eNB 100 side and may effectively use the wireless resource. In particular, the call processing control unit 144 monitors the traffic in the eNB 100 and may reallocate the wireless resource according to the traffic, and as a result, the reallocation of the wireless resource may be implemented in real time even with respect to the rapid increase of the UE 300 that is present in the cell of the eNB 100. As such, it is very advantageous to perform negotiation associated with the reallocation of the resource between the extended eNB 200 and the eNB 100 in that the resource is effectively used.

As described above, according to the wireless communication system of the embodiment, in an actuation timing of each device of the eNB 100 and the extended eNB 200 or a timing depending on a traffic situation in a general operation state, the wireless resource such as the frequency band or the time band possessed by the eNB 100 may be appropriately allocated between the eNB 100 and the extended eNB 200.

In the wireless communication system in the related art, which does not follow the embodiment, a change in design in the base station or an increase or decrease in component such as a resource card incorporated in the base station is requested in association with extension and reduction in the wireless resource in the base station. In the component, operation and maintenance for the setting change is required, and particularly, more detailed operation is required in order to implement real-time reallocation of the wireless resource depending on the traffic, and as a result, it is difficult to reallocate the wireless resource.

Meanwhile, in the wireless communication system of the embodiment, the wireless resource may be reallocated by controlling software with respect to the increase or decrease in traffic. As a result, from the business viewpoint of operating the wireless communication system, it is advantageous in that the wireless communication system may be maintained and operated at low cost while the situation of the service area may be flexibly handled in real time.

When it is not possible to endure the increase in traffic over a handleable range by the reallocation processing of the wireless resource of the embodiment, the handling by establishment of the new resource card or the change in design of the device in the related art is still available and the area may be more flexibly constructed.

In the description of the embodiment, the allocation of the wireless resource between the eNB 100 and the extended eNB 200 as the subordinate base station has been described. However, for example, a configuration in which the wireless resource is allocated to the other node from one node and the wireless communication is performed by using the each allocated wireless resource may be implemented in another combination. For example, the extended eNB 200 may be configured to directly notify the request for the allocation of the wireless resource to the MME 400 as the upper node of the eNB 100 and perform the communication by using the wireless resource allocated from the MME 400.

The present invention is not limited to the embodiment and may be appropriately changed within the scope without departing from the gist or spirit of the present invention read throughout the appended claims and the specification, and the wireless communication system, the communication control method, and the base station that follow the change are also included in the technical scope of the present invention.

As described above, in the wireless communication system, it is important to ensure the service area capable of providing the sufficient communication environment and flexibly extend the area under a situation in which a geographical state in the service area is changed from moment to moment. According to the configuration, the communication environment can be provided to the dead zone in the service area of the first base station or the service area itself can be extended, by the second base station installed under the first base station.

Further, in the wireless communication system, the wireless resource such as the frequency band which the resource control means decides to dynamically allocate in the first base station is allocated to the second base station. In this case, preferably, the allocated wireless resource is appropriately determined depending on the traffic or the situation of the frequency interference in each base station by the resource control means, and as a result, limited wireless resources can be more efficiently used.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system including a first base station and a second base station, the first base station communicating with a mobile station by using a wireless resource other than allocated wireless resource, the second base station being installed under the first base station, the second base station communicating with a mobile station by using wireless resource allocated by the first base station, wherein
the first base station comprises a resource control unit that controls allocation of the wireless resource to the second base station, the resource control unit reallocating the wireless resource depending on a communication situation of the first base station when the second base station requests reallocation of the wireless resource, and
the second base station comprises
a communication unit that communicates with the mobile station by using the wireless resource allocated from the first base station, and
a resource request unit that requests the reallocation of the wireless resource to the first base station.

2. The wireless communication system according to claim 1, wherein the resource control unit controls the allocation of the wireless resource to the second base station based on a communication amount in the first base station.

3. The wireless communication system according to claim 1, wherein the resource request unit requests the allocation of the wireless resource to the first base station based on a communication amount in the second base station.

4. The wireless communication system according to claim 1, wherein the resource control unit controls the allocation of the wireless resource to the second base station when the second base station is actuated.

5. The wireless communication system according to claim 1, wherein
the first base station and the second base station use a common control protocol for controlling the allocation of the wireless resource, and
the resource control unit allocates the wireless resource by using the control protocol.

6. A communication control method in a wireless communication system including a first base station and a second base station, the first base station communicating with a mobile station by using a wireless resource other than allocated wireless resource, the second base station being installed under the first base station, the second base station communicating with a mobile station by using wireless resource allocated by the first base station, the communication control method comprising:
controlling allocation of the wireless resource to the second base station from the first base station, by the first base station;
communicating with the mobile station by using the wireless resource allocated from the first base station, by the second base station;
requesting the reallocation of the wireless resource to the first base station, by the second base station; and
reallocating the wireless resource depending on a communication situation of the first base station when the second base station requests reallocation of the wireless resource.

* * * * *